US006004013A

United States Patent [19]

Raillard

[11] Patent Number: 6,004,013

[45] Date of Patent: Dec. 21, 1999

[54] MOTOR VEHICLE HEADLIGHT HAVING A STYLING EMBELLISHER

[75] Inventor: Vincent Raillard, Pantin, France

[73] Assignee: Valeo Vision, Bobigny, France

[21] Appl. No.: 08/996,975

[22] Filed: Dec. 23, 1997

[30] Foreign Application Priority Data

Dec. 26, 1996 [FR] France .................................. 96 16041

[51] Int. Cl.[6] .............................. B60Q 1/04; F21V 21/00

[52] U.S. Cl. .......................... 362/509; 362/539; 362/351; 362/352; 362/806

[58] Field of Search .................................... 362/510, 539, 362/519, 806, 351, 352

[56] References Cited

U.S. PATENT DOCUMENTS

| | | | |
|---|---|---|---|
| 5,156,453 | 10/1992 | Pinson | 362/521 |
| 5,260,856 | 11/1993 | Perthus et al. | 362/510 |
| 5,556,190 | 9/1996 | Saijo | 362/519 |
| 5,567,033 | 10/1996 | Tanaka et al. | 362/510 |

FOREIGN PATENT DOCUMENTS

| | | | |
|---|---|---|---|
| 692 670 | 1/1996 | European Pat. Off. . | |
| 718 545 | 6/1996 | European Pat. Off. . | |
| 274325 | 7/1988 | France | 362/510 |

*Primary Examiner*—Thomas M. Sember
*Attorney, Agent, or Firm*—Morgan & Finnegan, L.L.P.

[57] ABSTRACT

A motor vehicle headlight has a reflector receiving a lamp, and a cover lens in front of the reflector. A glass styling embellisher is fitted in front of the lamp, and is secured by a one piece fastening member which is essentially in two parts, which are brought together by bending so as to put the fastening member in a closed condition in which a flange of the embellisher is trapped between retaining elements of the fastening member. The two parts of the latter have retaining lugs for retaining the fastening member, carrying the embellisher, in position in a lamp aperture of the reflector.

39 Claims, 4 Drawing Sheets

MOTOR VEHICLE HEADLIGHT HAVING A STYLING EMBELLISHER

FIELD OF THE INVENTION

The present invention relates in general terms to headlights for motor vehicles, and more particularly to headlights which include a styling embellisher mounted in front of the lamp which constitute the light source of the headlight.

BACKGROUND OF THE INVENTION

A conventional vehicle headlight comprises a housing which is closed at the front by a cover lens, and which contains a reflector with the lamp mounted at the base of the reflector. In order to prevent the direct emission of light by the lamp towards the front that would dazzle drivers of vehicles travelling in the opposite direction, especially where the headlight is so designed as to emit a cut off beam (for example a cruising beam or a fog penetrating beam) which is adapted to avoid such dazzling, it is known to equip the lamp with a mask or occulter for masking direct light, so that the light emitted by the filament or arc of the lamp is prevented from reaching the cover lens directly, and the environment outside the vehicle. The mask causes the light radiation to be directed towards the whole surface area of the reflector. It also enables the light to be concealed, for aesthetic reasons, when the headlight is extinguished.

In the prior art, the mask generally has a lateral portion in the form of a frustoconical skirt, having an aperture adjacent to the lamp and held in front of the lamp by means of at least of one fastening lug which connects it to the reflector. In front of this frustoconical part, there may be fitted a front piece or styling embellisher, the purpose of which is to improve the appearance of the extinguished headlight and also, optionally, to assist in the masking of the radiation. The means for mounting this front piece on the frustoconical part are usually of the snap fitting type, or the type having deformable fastening lugs.

Such mounting means have to two main disadvantages, namely that, firstly, they are not easy to realize in practice, and secondly they make it difficult to fix a styling embellisher or front member if the latter is made of glass, which cannot conveniently be extended by the fastening tongues or lugs that are necessary for the two types of fastening mentioned above.

SUMMARY OF THE INVENTION

An object of the present invention is to provide a means for fastening a styling embellisher in a motor vehicle headlight, which is inexpensive to make and easy to fit. Another object of the present invention is to propose mounting means which are adapted to hold in place an enlarged range of different styling embellishers, in particular those made of glass.

According to the invention, a motor vehicle headlight, comprises a reflector receiving a lamp and a cover lens arranged in front of the reflector, together with a styling embellisher mounted in front of the lamp, and fastening means for fastening the styling embellisher in the headlight, wherein the fastening means consist of a single component having two parts, each of the part including a retaining means for retention of the styling embellisher together with a fastening lug, the two parts being adapted to be brought together into a closed condition, so as to trap the styling embellisher between one of the retaining means and the other, and so that the fastening lugs can be engaged in an aperture for the lamp, formed in the reflector.

According to a preferred feature of the invention, the assembly consisting of the styling embellisher and the fastening means constitute a unit which is adapted to be fitted in the headlight through the rear of the reflector.

Preferably, the two parts that constitute the fastening means are integral with each other, the fastening means being a single fastening member which is bendable by deformation of the material of which it is made.

The styling embellisher is preferably a glass component. The surface of this glass component adjacent to the lamp is then preferably provided with a reflective coating.

The glass component may be of tinted glass.

According to another preferred feature of the invention, the styling embellisher includes a collar portion, while the fastening means include a washer element on which the collar portion of the embellisher is in engagement when the fastening means is in its closed condition with the said two parts of the fastening means brought together. In preferred embodiments with this feature, each of the said parts of the fastening means is provided with at least one flexible lug which comes into engagement against the collar portion of the embellisher so as to put the collar portion in engagement against the washer element when the fastening means is in its closed position. In that case, preferably, each flexible lug is an integral part of the component, and is oriented by bending.

According to a further preferred feature of the invention, the flexible lugs are bent elastically against the styling embellisher, when the fastening means is in its closed condition.

According to yet another preferred feature of the invention, each of the said two parts of the fastening means is a half shell portion such that, when the fastening means is in its closed condition, the two half shell portions are closed one against the other, thus constituting a substantially cylindrical mask which is held around a front portion of the lamp by the fastening lugs. The two semi-cylindrical portions of the fastening means are then preferably overlapped.

At least one of the fastening lugs may be provided with stiffening ribs.

At least one of the fastening lugs may have at its end an aperture for receiving a fastening screw.

According to a still further preferred feature of the invention, the headlight further includes a spring carrying crown fitted in front of the reflector. In this case, and where at least one of the fastening lugs has at its end an aperture for receiving a fastening screw, the spring carrying crown preferably has an aperture which is aligned with each of the apertures in the fastening lugs in the fitting position.

In the case where the headlight includes a spring carrying crown, at least one of the fastening lugs may be arranged to be seamed over the spring carrying crown.

Further features and advantages of the invention will appear more clearly on a reading of the following detailed description of some preferred embodiments of the invention, given by way of non-limiting example only and with reference to the accompanying drawings.

DETAILED DESCRIPTION OF THE INVENTION

Figure 1:
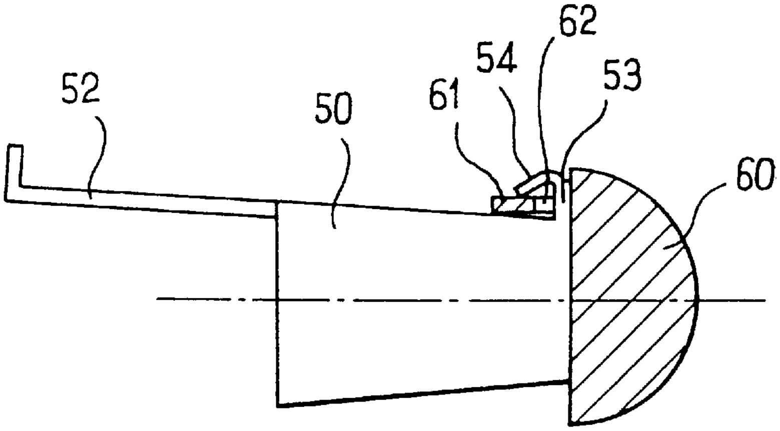
FIG. 1 is a view in vertical axial cross-section of a mask and embellisher unit in a known style.

Reference is first made to FIG. 1, which shows diagrammatically a component in the form of a mask and embellisher unit. This unit is an assembly, in a known style, of a mask or occulter and an embellisher. It consists of a part 50 which is the mask proper, and which in this example has a circular cross section, slightly flared. The mask 50 is mounted on a headlight reflector by means of one or more retaining lugs 52, in such a way as to put the part 50 in front of a lamp of the headlight, in order to prevent light emitted by the lamp being transmitted directly from the lamp towards the cover lens of the headlight and thence into the environment. The mask 50 also masks the lamp itself when the headlight is extinguished.

The edge of the mask 50 preferably has a profile such that it masks quite precisely all of the light rays that are not directed towards the optically useful parts of the reflector, that is to say the light rays which are directed, in particular, towards the edges of the reflector and towards the cover lens.

The other component of the unit is the embellisher, indicated at 60. The embellisher 60 is mounted on the mask 50 in such as way as to modify the appearance of the headlight when the latter is extinguished. The visual impact of the embellisher 60, as seen through the cover lens of the headlight, bears an inverse relationship to the ability of the cover lens to deviate light. The lens may indeed by smooth.

The embellisher 60 is mounted on the mask 50 by means of at least one flat tongue 61 which extends towards the back of the headlight. An aperture 62 is formed in the tongue 61. The mask 50 has an integral fastening lug having a portion 53 which is passed through the aperture 62, and which is terminated by a portion 54 which is bent over to engage the outer side of the tongue 61 as shown.

Figure 2:
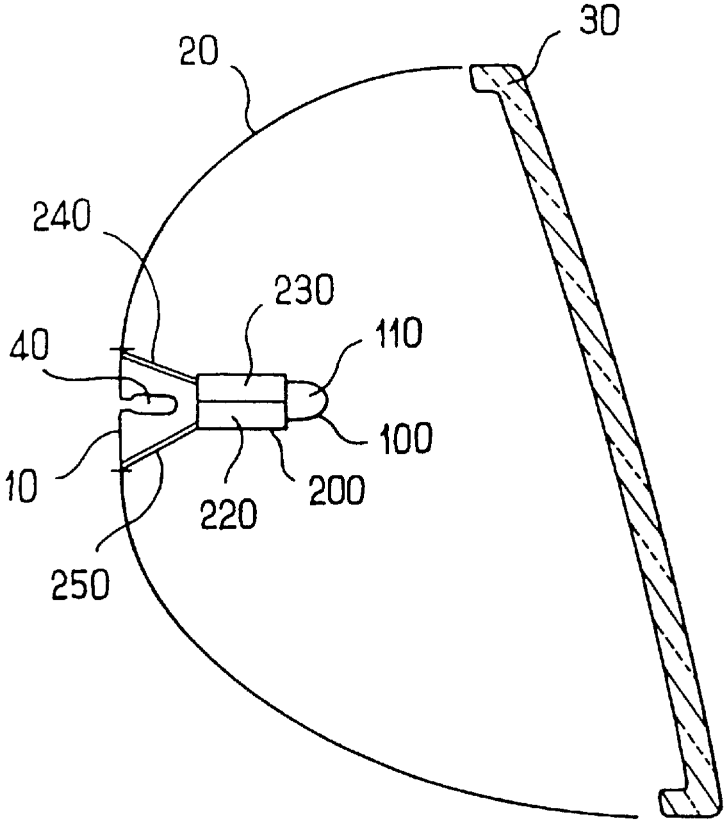
FIG. 2 is a view in vertical axial cross-section of a headlight in accordance with the present invention.

Reference is now made to FIGS. 2, 5, 6 and 7, which show a mask and embellisher unit in accordance with the present invention, and which consists of an assembly of a styling embellisher and a fastening means. FIG. 2 shows the headlight itself, comprising in the usual way a reflector 20, a cover lens 30, and a lamp 40 mounted in the base of the reflector.

The general structure of the mask and embellisher unit consists of two parts, namely a styling embellisher 100, which in this case is a glass component convex towards the front, and a lateral fastening member 200 made of metal, which in this example is a one-piece component, though it could be made in more than one piece. In this preferred embodiment, the glass component also acts as a mask or occulter for direct light, and the fastening member also has a masking function.

In another version, the fastening member 200 has no masking function. The front member consisting of the embellisher 100 may serve no other purpose than that of a styling embellisher.

The glass member 100 itself consists of two portions, namely a sharply bowed shell portion 110, having a symmetry of revolution about an axis A, with the base of the shell portion in a plane at right angles to the axis A, and a collar portion 120 which extends the base of the bowed shell portion 110 in the same plane at right angles to the axis A. The external profile of the base of the shell portion 110 is a circle of diameter D1, while the outside profile of the collar portion 110 is a circle of diameter D2.

Figure 5:
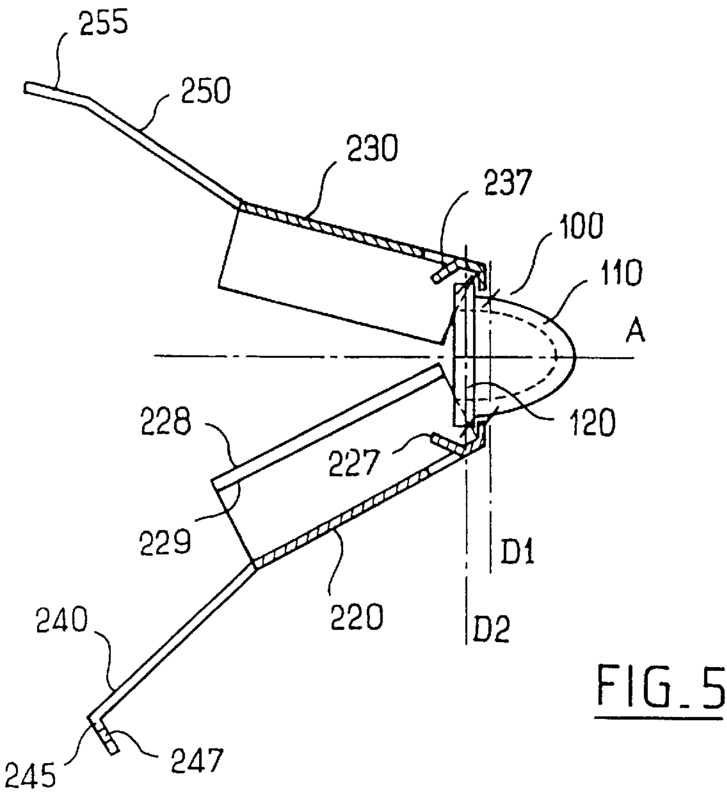
FIG. 5 is a side view of the assembly consisting of a glass styling embellisher and a fastening member in accordance with the present invention, shown in an intermediate condition in which the two parts of the fastening member are not fully closed up against each other.
Figure 6:
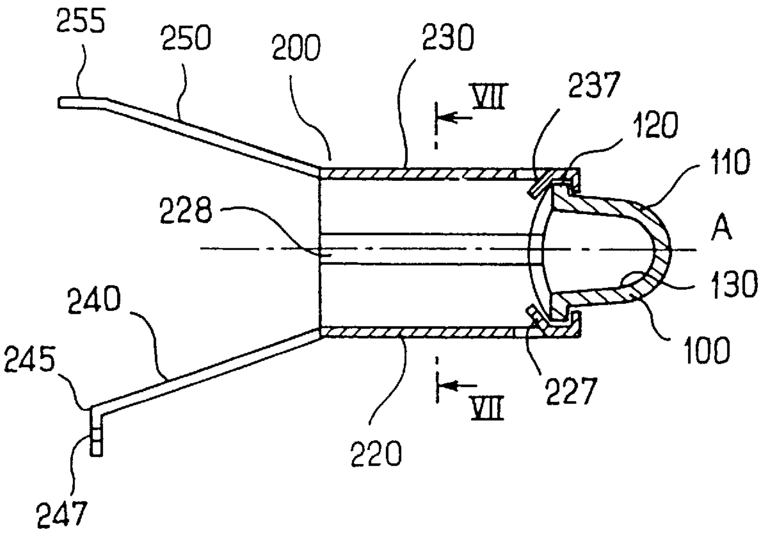
FIG. 6 is a side view of the same assembly as in FIG. 5, shown here in the position in which both parts of the fastening member are fully closed up against each other.
Figure 7:
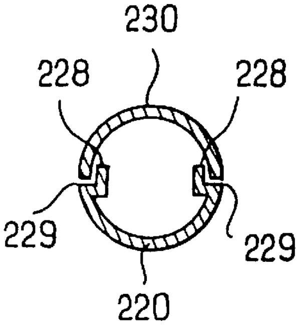
FIG. 7 is a view in cross-section, taken on the transverse plane VII—VII in FIG. 6, of the same assembly as in FIG. 6, and with the fastening member shown in the same condition.

In the preferred embodiments seen in FIGS. 5, 6 and 7, the internal surface 130 of the shell portion 110 is given suitable treatment to make it opaque to light from the lamp of the headlight, and also to make it reflective when seen from the front, i.e. from the right in FIG. 5. These features are obtained for example when the internal surface 130 is illuminated. Such an arrangement enables an impression of brilliance and depth to be obtained when the headlight is extinguished and observed from in front of the vehicle. The glass of at least the shell portion 110 may also be colored.

Figure 3:
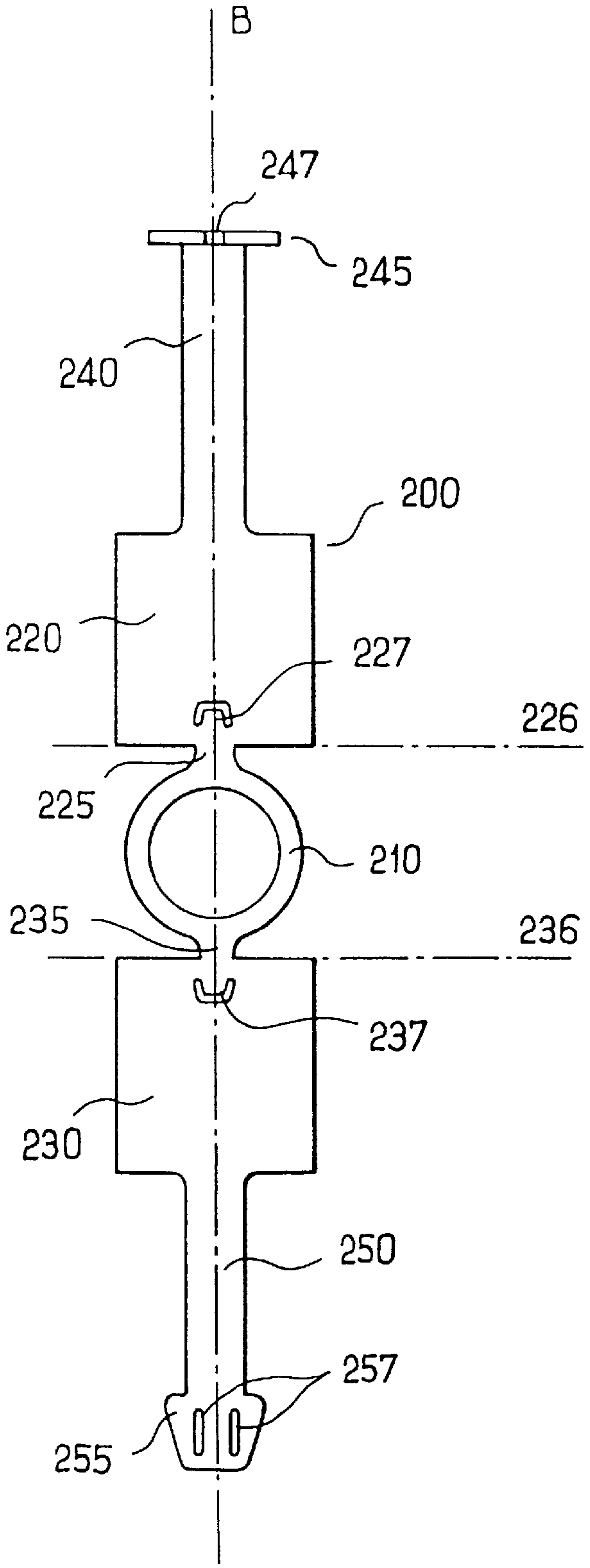
FIG. 3 is a front view of a fastening member in an open or unbent condition, in accordance with the present invention.
Figure 4:
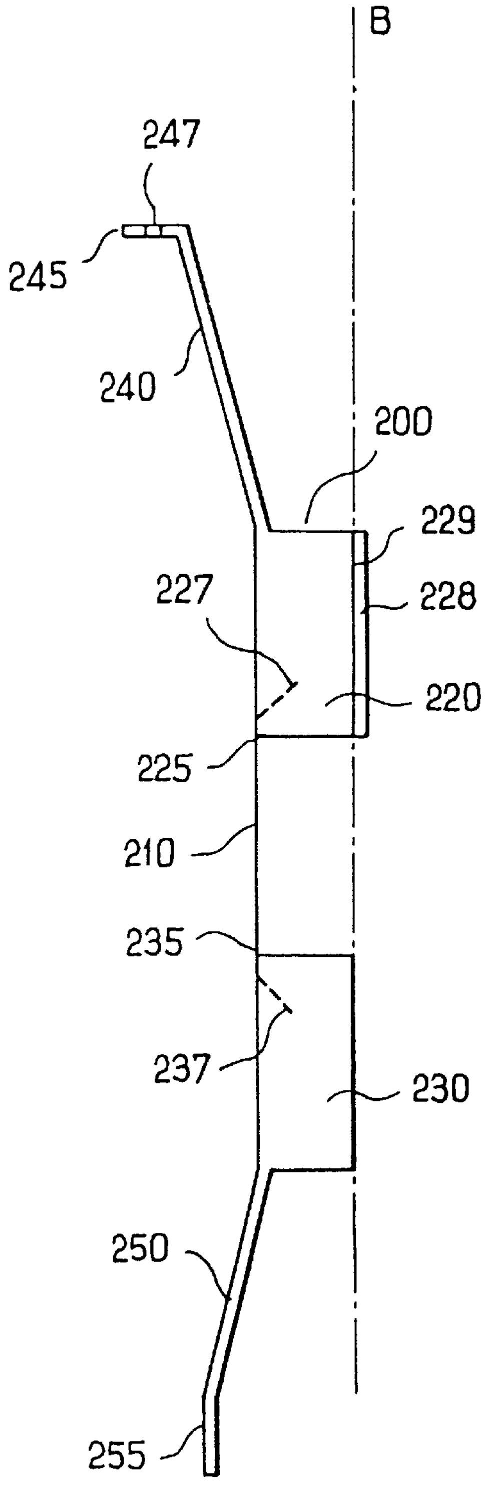
FIG. 4 is a side view of a fastening member in the open condition, in accordance with the present invention.

The fastening member 200 will now be described in a preferred embodiment, with particular reference to FIGS. 3 and 4. It will of course be understood that any other suitable means for fastening the glass member 100 may be used instead. In the present example, the fastening member 200 has a central circular abutment crown portion, or washer element, 210, also referred to for convenience as the washer. The internal diameter of this washer is complementary to the outside diameter D1 of the base of the bowed shell portion 110. The fastening member 200 also includes two half shell portions 220 and 230 in the form of half cylinders. In the open, or unbent, condition shown in FIGS. 3 and 4, the two half cylinders 220 and 230 are adjacent to the washer 210, and are so disposed that axis of both half cylinders are coincident with a common axis B which intersects at right angles the axis of revolution of the circular washer 210. In addition, the plane of the circular washer 210 is tangential to each of the two half cylinders 220 and 230, and parallel to the plane defined by the two longitudinal edges of the half cylinders. The half cylinders 220 and 230 are joined to the washer 210 by bridges 225 and 235 respectively, which can be permanently deformed by bending. A flexible lug 227, 237 constitutes an extension of each of the bendable bridges 225 and 235 respectively. Each of the lugs is obtained by stamping out a U-shape in each of the half cylinders 220 and 230, with the U being orientated in such a way that its branches point towards the washer 210. The flexible lugs 227 and 237 are then bent from their base towards the interior of the half cylinders 220 and 230, so as to have a final inclination of approximately 45° with respect to the direction of the axis B. The base of each of the flexible lugs 227 and 237 lies at a distance less than or equal to the thickness of the collar portion 120 of the embellisher, from the bending axes 226, 236 of the corresponding bendable bridges 225, 235 respectively.

Each of the half cylinders 220 and 230 is extended, at its end opposite to that carrying the corresponding bendable bridge 225, 235, by fastening lugs 240, 250 respectively. In the preferred embodiment shown in the FIGS. 3, 4, 5, 6, 8 and 9, one of the fastening lugs, 240, is extended by a plate element 245 which is substantially in the form of a disk, and which has a central aperture 247 for receiving a fastening screw. The other fastening lug, 250, is also extended by a plate element, 255. The plate element 255 has two oblong slots 257 for receiving seaming tongues.

Each of the longitudinal edges 229 of the half cylinder 220 has over its whole length an extension 228 which is slightly offset towards the inside of the half cylinder, thus defining a groove for receiving the corresponding longitudinal edge of the other half cylinder 230.

In a preferred embodiment, at least one of the fastening lugs 240, 250 is given increased rigidity by forming it with suitable ribs, the assembly consisting of the glass component 100 and the fastening member 200 thereby being made more resistant to vibration.

Fitting of the mask and the embellisher unit is carried out in the following way. The fastening member 200 is first in its open condition shown in FIGS. 3 and 4. The glass member 100 is engaged in the washer member 210, so that the bowed shell portion 110 of the glass member 100 extends towards the outside of the two half cylinders of the fastening member. In this way the collar portion 210 of the glass component 100 is in abutment against the washer 210.

The two half cylinders 220 and 230 are then bent back towards each other by bending the bridges 225 and 235 about their bending axes 226 and 236 respectively, until the respective axis of the half cylinders coincide with the axis of the washer 210 as shown in FIG. 6. In this closed condition, the two flexible lugs 227 and 237 are in engagement against the collar portion 120, and are bent resiliently so that they exert a forward return force on the glass component 100, the collar portion thus being held in engagement against the washer portion 210.

In the closed condition shown in FIG. 6, the longitudinal edges of the half cylinder 230 are in engagement in the grooves mentioned above and defined between the extensions 228 and the longitudinal edges 229 of the half cylinder 220. In this way, no light is able to pass through the zone of contact between the two half cylinders 220 and 230. The position of the rear edges of the two half cylinders, with respect to the lamp (shown at 40 in FIG. 2) of the headlight is so defined that the half cylinders arrest any light rays that are not directed towards the optically useful parts of the reflector 20, FIG. 2, and in particular those light rays which are directed towards the edges of the reflector and towards the cover lens 30, FIG. 2. Those light rays that are directed towards the useful parts of the reflector 20 pass behind the rear edges of the half cylinders 220 and 230, between the fastening lugs 240 and 250.

Figure 8:
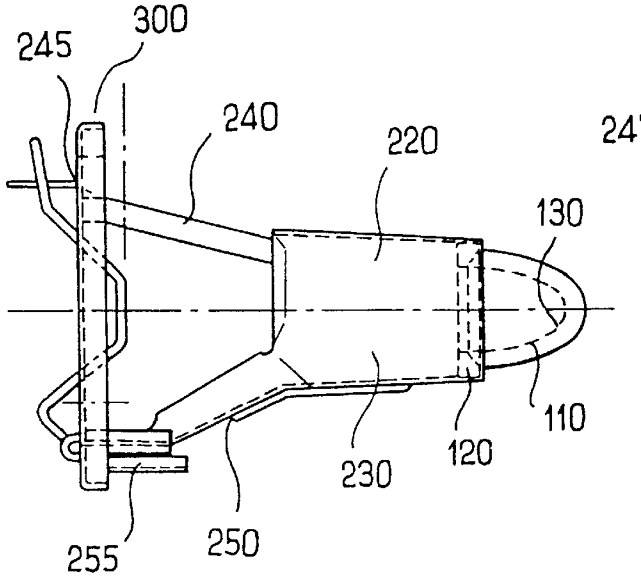
FIG. 8 is a side view of a unit consisting of an assembly of a styling embellisher and a fastening means in accordance with the present invention, in which the fastening means consists of a fastening member, in its closed condition and fitted on a spring carrying crown.
Figure 9:
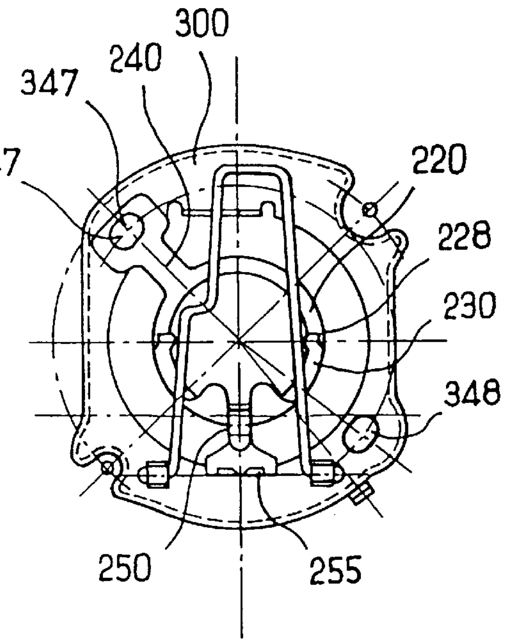
FIG. 9 is rear view of the unit shown in FIG. 8, in the same condition.

Reference is now made to FIGS. 8 and 9, showing the unit consisting of the styling embellisher 100 and the fastening member 200, assembled together as just described and fixed on a spring carrier crown 300. The unit 100, 200 is adapted to be introduced into the headlight through an aperture 10 formed in the rear part of the reflector 20. In this preferred embodiment, the fastening lug 250 is upset over the crown 300 at the plate element 255, while the fastening lug 240 is fixed to the reflector at the same time as the crown, by a common fastening screw which passes through the aperture 247 in the fastening lug 240 and an aperture 347 in the spring carrier crown 300.

The spring carrier crown 300 also has a further aperture 348, diametrically opposed to the aperture 347 and adapted to receive another fastening screw.

The present invention is in no way limited to the embodiments described above and shown in the drawings, as a person familiar with this technical field will be able to apply to it any variation or modification in accordance with the spirit of the invention. In particular, the two half cylinders 220 and 230 may be of flared form, so that in the closed position, they constitute the frustoconical mask shown in FIG. 8.

What is claimed is:

1. A motor vehicle headlight comprising:

a lamp;

a reflector having an aperture adapted to receive the lamp;

a cover lens disposed in front of the reflector;

a styling embellisher arranged in front of the lamp; and fastening means for securing the embellisher in the headlight, wherein the fastening means comprises a single fastening member having a first portion, a second portion, and a third portion connected between the first and second portions, the first, second and third portions defining retaining means having a plurality of retaining elements for holding the embellisher in position, each of the first and second portions including a fastening lug for securing the fastening member in place in the headlamp, the third portion being adapted to allow the first and second portions to be brought together to a closed condition to trap the embellisher between the retaining elements, the fastening lugs being arranged so that the fastening member with the embellisher held therein is adapted to fit to the reflector by engagement of the fastening lugs in the aperture.

2. A motor vehicle headlight according to claim 1, wherein the fastening member carrying the embellisher is adapted to be fitted in the headlight through a rear of the reflector.

3. A motor vehicle headlight according to claim 1, wherein the third portion of the fastening member is deformable for bringing the said first and second portions together.

4. A motor vehicle headlight according to claim 1, wherein the embellisher is of glass.

5. A motor vehicle headlight according to claim 4, wherein the embellisher has a surface adjacent to the lamp and a reflective coating on surface.

6. A motor vehicle headlight according to claim 4, wherein the embellisher is of colored glass.

7. A motor vehicle headlight according to claim 1, wherein the embellisher includes a collar portion, the third portion of the fastening member having a retaining washer element for engaging against the collar portion when the fastening member is in the closed condition.

8. A motor vehicle headlight according to claim 7, wherein each of the first and second portions of the fastening member includes a flexible lug having a retaining element, for engaging against the collar portion so as to hold the collar portion in engagement against the washer element when the fastening member is in the closed condition.

9. A motor vehicle headlight according to claim 8, wherein each of the flexible lugs is a bent back integral part of a corresponding one of the first and second portions of the fastening member.

10. A motor vehicle headlight according to claim 9, wherein the flexible lugs are flexed elastically against the embellisher in the closed condition of the fastening member.

11. A motor vehicle headlight according to claim 1, wherein each of the first and second portions of the fastening member further includes an opaque portion in the form of at least a half shell, such that, in the closed condition, the two half shells are closed against each other to form a substantially cylindrical mask, the half shells being so disposed that, when the mask is secured by the fastening lugs, the mask surrounds a front portion of the lamp.

12. A motor vehicle headlight according to claim 11, wherein the two half shells are configured to overlap when the fastening member is in the closed condition.

13. A motor vehicle headlight according to claim 1, wherein at least one of the fastening lugs is ribbed.

14. A motor vehicle headlight according to claim 1, wherein at least one of the fastening lugs of the fastening member has a terminal end portion defining a hole therein for receiving a fastening screw.

15. A motor vehicle headlight according to claim 14, further including a spring carrier crown mounted behind the reflector, the spring carrier crown having an aperture aligned with each of the apertures in the fastening lugs of the fastening member.

16. A motor vehicle headlight according to claim 1, further including a spring carrier crown mounted behind the reflector.

17. A motor vehicle headlight according to claim 15, wherein at least one of the fastening lugs is seamed on the spring carrier crown.

18. A fastener for securing an embellisher in a headlight comprising:

means for holding the embellisher, said means for holding including a first portion, a second portion and a third portion connected between the first and second portions, the third portion being adapted to allow the first and second portions to be brought together to a closed condition to trap at least a portion of the embellisher therein; and means for connecting said means for holding in the headlight.

19. The fastener according to claim 18, wherein said means for holding includes means for forming a mask in the closed condition.

20. The fastener according to claim 18, wherein said means for holding includes means for retaining the portion of the embellisher against an interior surface of said means for holding in the closed condition.

21. The fastener according to claim 18, wherein said means for holding is an integral unit.

22. The fastener according to claim 18, wherein said means for connecting is integrally connected to said means for holding.

23. The fastener according to claim 18, wherein said means for connecting includes means for resisting vibrations.

24. A vehicle headlight comprising:

a lamp;

a reflector adapted to receive the lamp;

a cover lens disposed in front of the reflector;

an embellisher; and a fastener comprising:

means for holding the embellisher, said means for holding including a first portion, a second portion and a third portion connected between the first and second portions, the third portion being adapted to allow the first and second portions to be brought together to a closed condition to trap at least a portion of the embellisher therein, and means for connecting said means for holding in the headlight.

25. A fastener for securing an embellisher to a headlight comprising:

a fastening member having a first portions a second portion and a third portion connected between the first and second portions, the third portion adapted to allow said first portion and said second portion to move to a closed condition to trap at least a portion of the embellisher therein; and a fastening lug, connected to the fastening member, for connecting the fastening member to the headlight.

26. The fastener according to claim 25, wherein said fastening lug is connected to one of said first portion and said second portion.

27. The fastener according to claim 26, wherein said fastening member includes at least one retaining element adapted to engage against the at least a portion of the embellisher to retain the at least a portion of the embellisher in said fastening member in the closed condition.

28. The fastener according to claim 25, wherein said first portion and said second portion together form a mask in the closed condition.

29. The fastener according to claim 25, wherein said fastening member further includes a third portion connected between said first portion and said second portion, said first portion and said second portion being movably connected to said third portion.

30. The fastener according to claim 29, wherein said third portion is integral to said first portion and said second portion.

31. The fastener according to claim 29, wherein said fastening member includes a first retaining element and second retaining element connected to said first portion and said second portion, respectively, the portion of the embellisher being engaged between said retaining elements and said third portion in the closed condition.

32. The fastener according to claim 25, wherein said fastener lug is configured to resist vibrations.

33. A method of assembling an embellisher in a headlight through the use of a fastener according to claim 25, the method comprising the steps of:

receiving the portion of the embellisher in said fastening member;

moving said first portion and said second portion together to the closed position to hold the portion of the embellisher therebetween; and connecting said first fastening lug to the headlight.

34. A vehicle headlight comprising:

a lamp;

a reflector adapted to receive the lamp;

a cover lens disposed in front of the reflector;

an embellisher; and a fastener comprising:

a fastening member having a first portion a second portion and a third portion connected between the first and second portions, the third portion adapted to allow said first portion and said second portion to move to a closed condition to trap at least a portion of the embellisher therein, and a fastening lug, connected to the fastening member, for connecting the fastening member to the headlight.

35. The vehicle headlight according to claim 33, wherein the embellisher is glass.

36. The vehicle headlight according to claim 33, wherein the embellisher has a surface adjacent to the lamp and a reflective coating on the surface.

37. The vehicle headlight according to claim 33, wherein the embellisher is colored glass.

38. The vehicle headlight according to claim 33, wherein the embellisher includes a collar portion and said fastening member includes an opening adapted to receive the embellisher, the opening configured to prevent said collar portion therethrough.

39. A vehicle including a headlight according to claim 33.

* * * * *

UNITED STATES PATENT AND TRADEMARK OFFICE

CERTIFICATE OF CORRECTION

PATENT NO. : 6,004,013
DATED : December 21, 1999
INVENTOR(S) : Vincent Raillard

It is certified that error appears in the above-identified patent and that said Letters Patent is hereby corrected as shown below:

Column 8,
Line 3, please delete “portions” and insert therefor -- portion, --.

Signed and Sealed this

Twenty-ninth Day of June, 2004

JON W. DUDAS
*Acting Director of the United States Patent and Trademark Office*